(12) United States Patent
Davison

(10) Patent No.: US 6,648,573 B1  
(45) Date of Patent: Nov. 18, 2003

(54) RACK STORAGE SYSTEM WITH LATCHING SPRING

(75) Inventor: Ken Davison, Palos Verdes Estates, CA (US)

(73) Assignee: John V. R. Krummell, Jr., Huntington Beach, CA (US)

(*) Notice: Subject to any disclaimer, the term of this patent is extended or adjusted under 35 U.S.C. 154(b) by 156 days.

(21) Appl. No.: 09/996,163

(22) Filed: Nov. 27, 2001

(51) Int. Cl.⁷ .............................................. B65G 13/00
(52) U.S. Cl. ...................... 414/276; 211/151; 193/35 A
(58) Field of Search .................... 414/276; 211/151; 193/35 A

(56) References Cited

U.S. PATENT DOCUMENTS 3,610,372 A * 10/1971 Warren ........................ 188/32
4,542,815 A * 9/1985 Leemkuil ................. 193/35 A
4,582,188 A * 4/1986 Seiz et al. ...................... 193/40
5,598,934 A * 2/1997 Krummell et al. .......... 211/151
6,129,223 A * 10/2000 Krummell, Jr. ............. 211/151

FOREIGN PATENT DOCUMENTS

EP 553060 * 7/1993 ................. 414/276
RU 1472375 * 4/1989 ................. 414/276

* cited by examiner

*Primary Examiner*—Steven A. Bratlie  
(74) *Attorney, Agent, or Firm*—Perkins Coie LLP

(57) ABSTRACT

A latching spring for a push-back cart storage system includes a pair of spaced apart support rails, at least two cross members and a cart frame having a wheel assembly supported on the support rails and at least one latching spring. The latching spring is mounted on the cross members and engages with the cart frame. The spring latch prevents premature rearward rolling of unloaded carts in multiple cart push-back systems wherein the wheels of rearward rolling loaded carts roll on the unloaded carts.

15 Claims, 4 Drawing Sheets

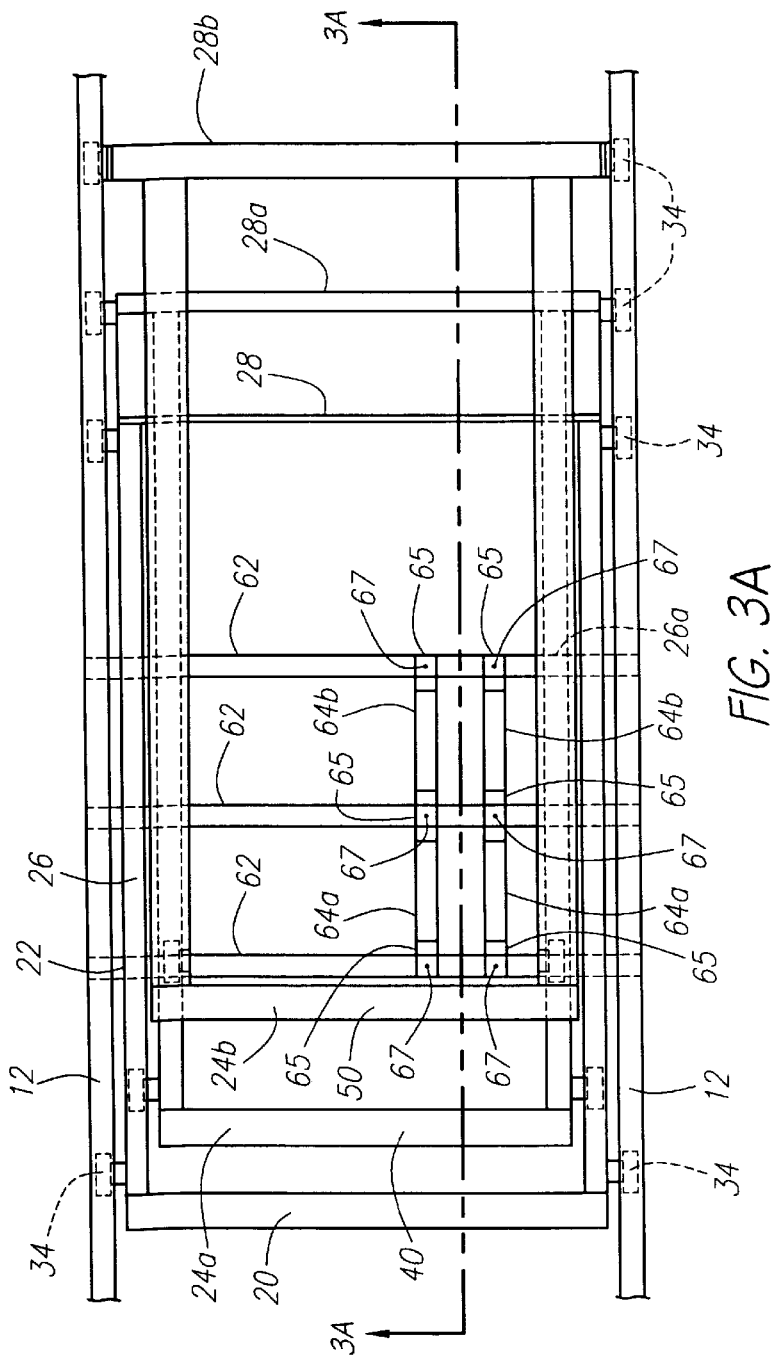
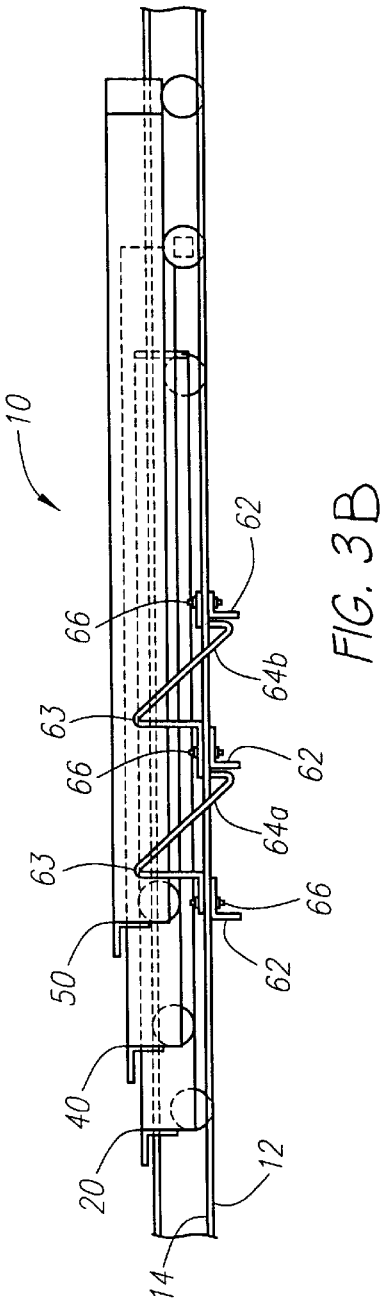

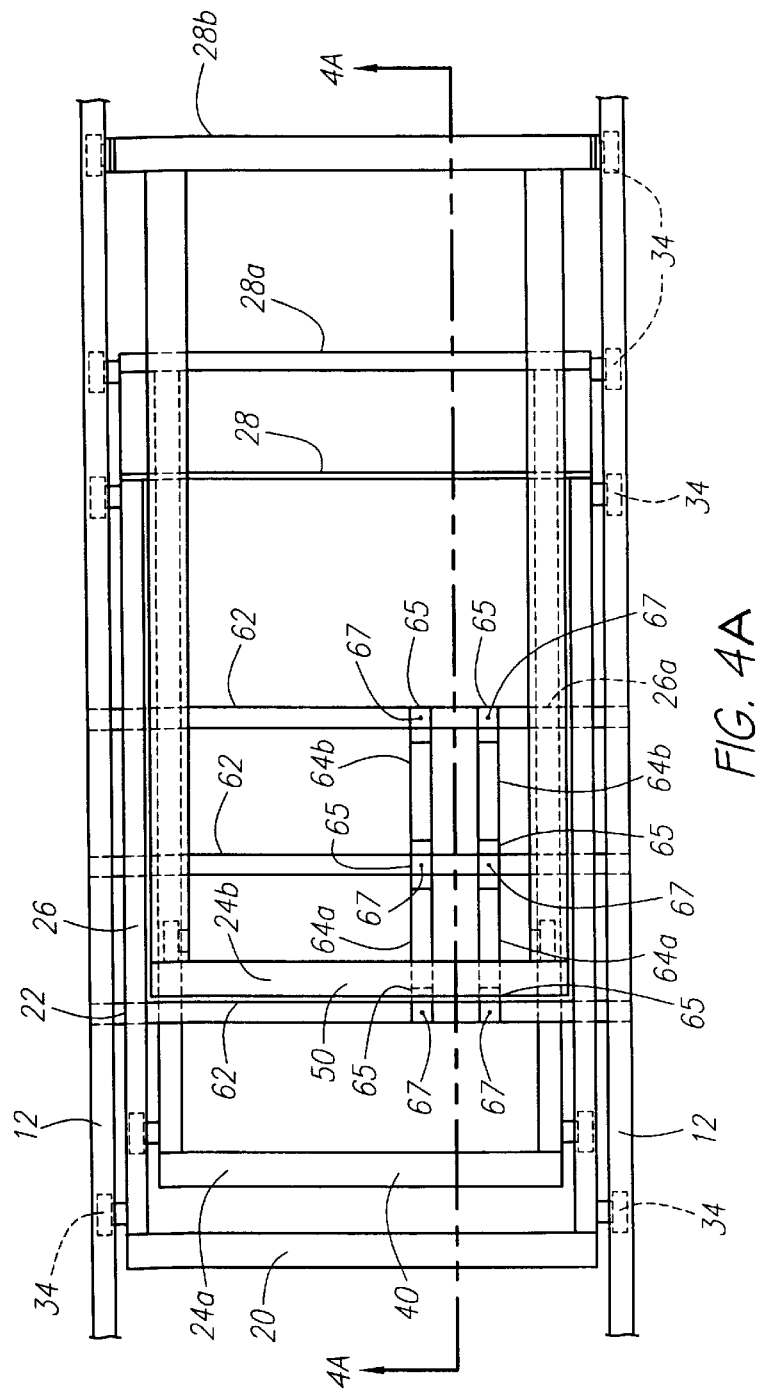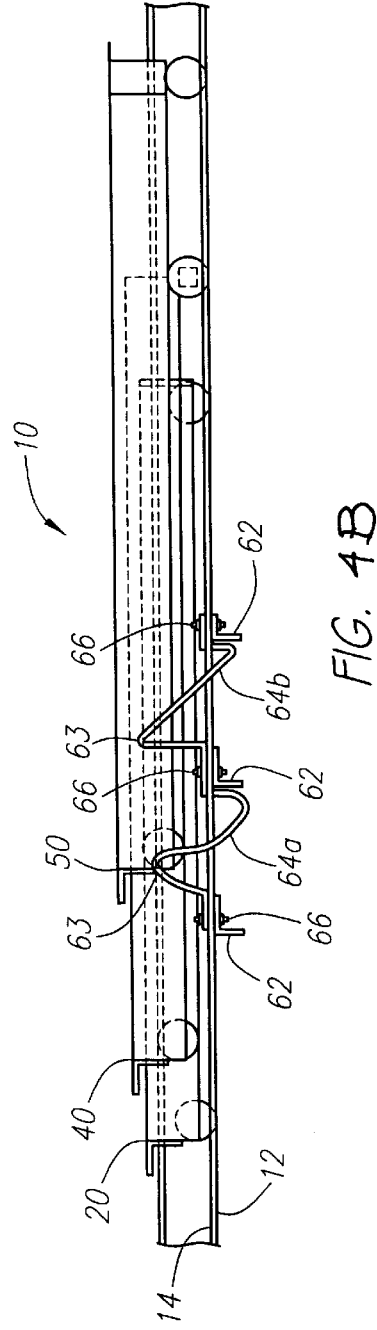
FIG. 4A
FIG. 4B

RACK STORAGE SYSTEM WITH LATCHING SPRING

BACKGROUND OF THE INVENTION

The field of the invention is push-back storage systems.

Push-back cart storage systems typically use rolling carts for carrying pallets or other cargo, on slightly inclined rails. By providing several carts on a set of rails, useable space between aisles in e.g., a warehouse, is increased as multiple pallets can be stored and retrieved from a single aisle. Consequently, aisle space necessary in conventional storage racks for forklift access may be used for additional storage racks, providing more efficient use of space.

With the present push back cart systems, the first pallet is placed on the first rolling cart by a forklift. The forklift then pushes the pallet along with the first cart so that the second cart can receive a pallet. Ideally, the second cart will be fully exposed so that it can receive a pallet. However, because the first cart's rollers roll along rails in the second cart, a frictional force is created by the rollers which tends to move the second cart along with the first cart. As a result of this movement, the second cart is not fully exposed and cannot receive a pallet. In cart systems having more than two carts, the same unwanted movement occurs in the other carts as they are subsequently loaded.

Although various push-back cart storage systems have been used in the past, there is a need for an improved system which prevents this unwanted movement of the cart immediately underneath the cart that is currently being loaded and pushed back.

SUMMARY OF THE INVENTION

To these ends, the present push-back cart storage system includes a pair of spaced apart support rails. An outer or first cart has wheels which roll on the support rails. The outer cart has side members and a middle or second cart has front wheels which roll on the side members of the outer cart. Rear wheels on the middle cart roll directly on the support rails. For a four deep system, an inner cart may be provided with front wheels rolling on side members of the middle cart, and with rear wheels of the inner cart rolling directly on the support rails.

A latching mechanism in a push-back cart storage system has a latch preferably mounted to cross members which are mounted to the support rails of the push back cart storage system.

In the preferred embodiment, the latching mechanism comprises a pair of spaced apart spring members mounted to cross members. Each spring member advantageously includes of a pair of spring plates mounted between the cross members. The carts are held in place by the engaged first spring plates until the loaded first cart reaches its rearmost position relative to the second cart. Once the first cart reaches that position, the front cross member on the second cart releases the first pair of spaced apart spring plates. The release is caused by the force of the forklift, which, in moving the second pallet into the pallet bay for ultimate placement onto the second cart, continues to push the first pallet rearwardly even after the first cart is in its rearmost position relative to the second cart. This rearward movement of the first pallet causes the front cross member of the second cart to push against the first pair of spring plates causing them to deflect downward and release the second cart so that it can move in the rearward direction. As the forklift continues to push the first pallet rearwardly, the front cross member of the second cart then pushes against the second pair of spring plates, causing them to deflect downward and release the second cart so that it can continue to move rearwardly until it reaches the rearmost position relative to the third cart.

Of course, in addition to this spring latch, various other mechanical equivalents, such as detent mechanisms, bump ramps, magnetic holding elements, may be used with the scope of the invention, to hold the carts in position while loading.

Accordingly, it is an object of the invention to provide an improved push-back cart storage system. Other and further objects and advantages will appear hereinafter.

BRIEF DESCRIPTION OF THE DRAWINGS

In the drawings, wherein similar reference characters denote similar elements throughout the several views:

FIG. 3A is a plan view of a push back cart storage system with the spring latch;

FIG. 3B is a section view taken along line 3A—3A of FIG. 3;

FIG. 4A is a plan view of a push back cart storage system with the top cart pushed back against the spring latch; and FIG. 4B is a section view taken along line 4A—4A of FIG. 4.

DETAILED DESCRIPTION OF THE PREFERRED EMBODIMENT

Figure 1:
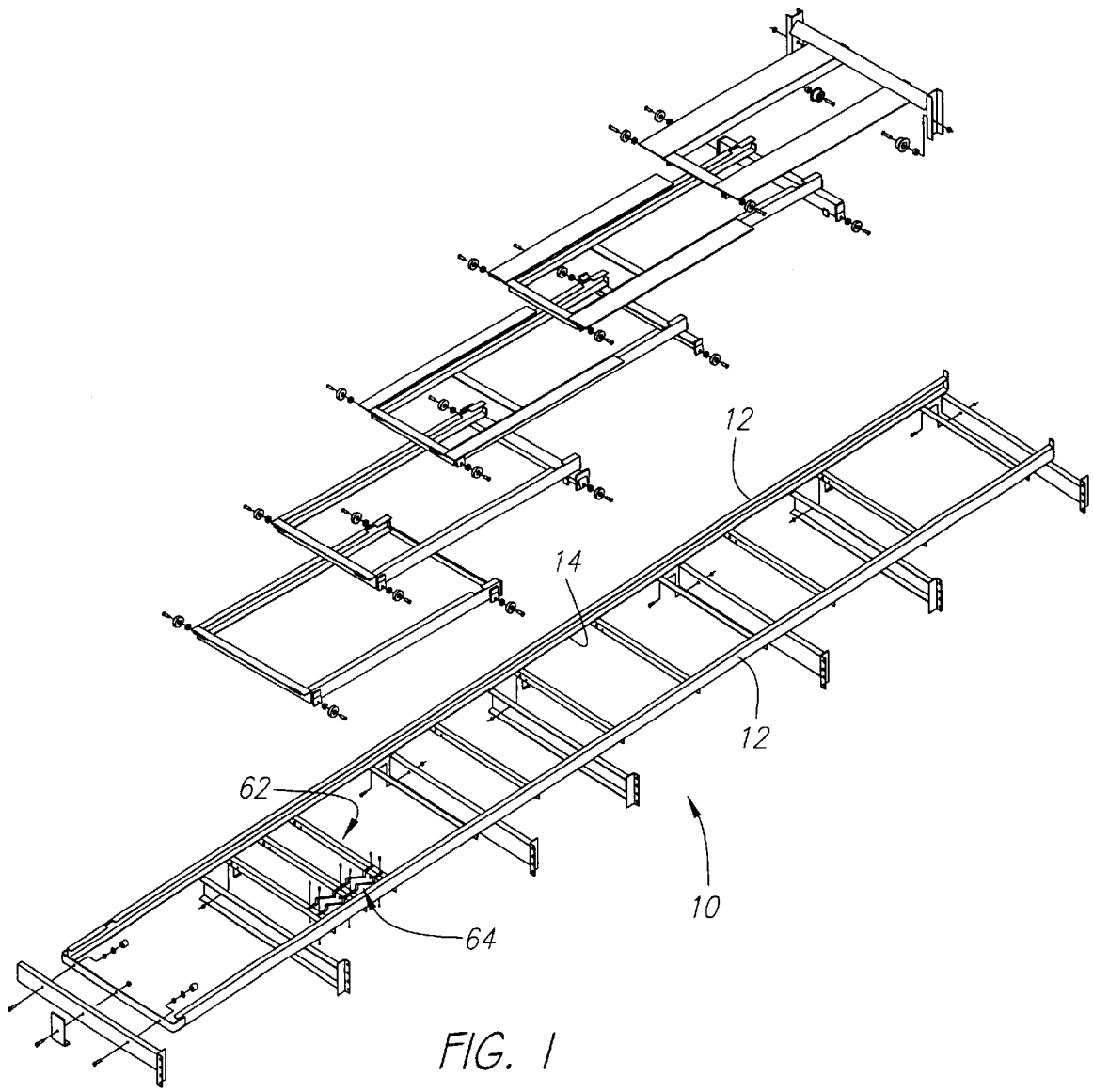
FIG. 1 is a perspective view of a 6-deep push back cart storage system with the spring latch.

With the present push back cart system 10, as described in U.S. Pat. No. 5,598,934, the disclosure of which is incorporated by reference, typically a first pallet is placed on a first cart by a forklift. Then a second pallet is moved into the pallet bay for placement onto a second cart, and it pushes the first pallet back. Ideally, this should cause the first cart to move back and thereby fully expose the second cart, for reception of the second pallet. However, because the first cart rolls inside of the second cart, a frictional force is created by the wheels of the first cart which tends to move the second cart backwards with the first cart. Heavy pallet loads, imperfect bearings and fast pallet movements may increase the extent of unwanted cart movement. As a result of the premature movement, the second cart is not properly positioned to receive the second pallet, i.e., the second cart tends to be shifted rearwardly from the front of the storage rack. In cart systems having more than two carts, the same disadvantageous premature rolling movement can arise due to friction between, e.g., the third cart and the wheels of the second cart, etc.

To overcome this disadvantage, a latching mechanism is provided, as shown in FIGS. 1–4A, where at least two spaced apart cross members 62 are attached to the spaced apart support rails 12 and at least one spring member 64 is attached to the cross members. The cross members 62 may be of various designs, e.g., I-beam, C-beam, etc. Preferably, the latching mechanism comprises three spaced apart cross members 62 attached to the support rails 12 and two spring members 64 attached to the cross members 62.

Figure 2:
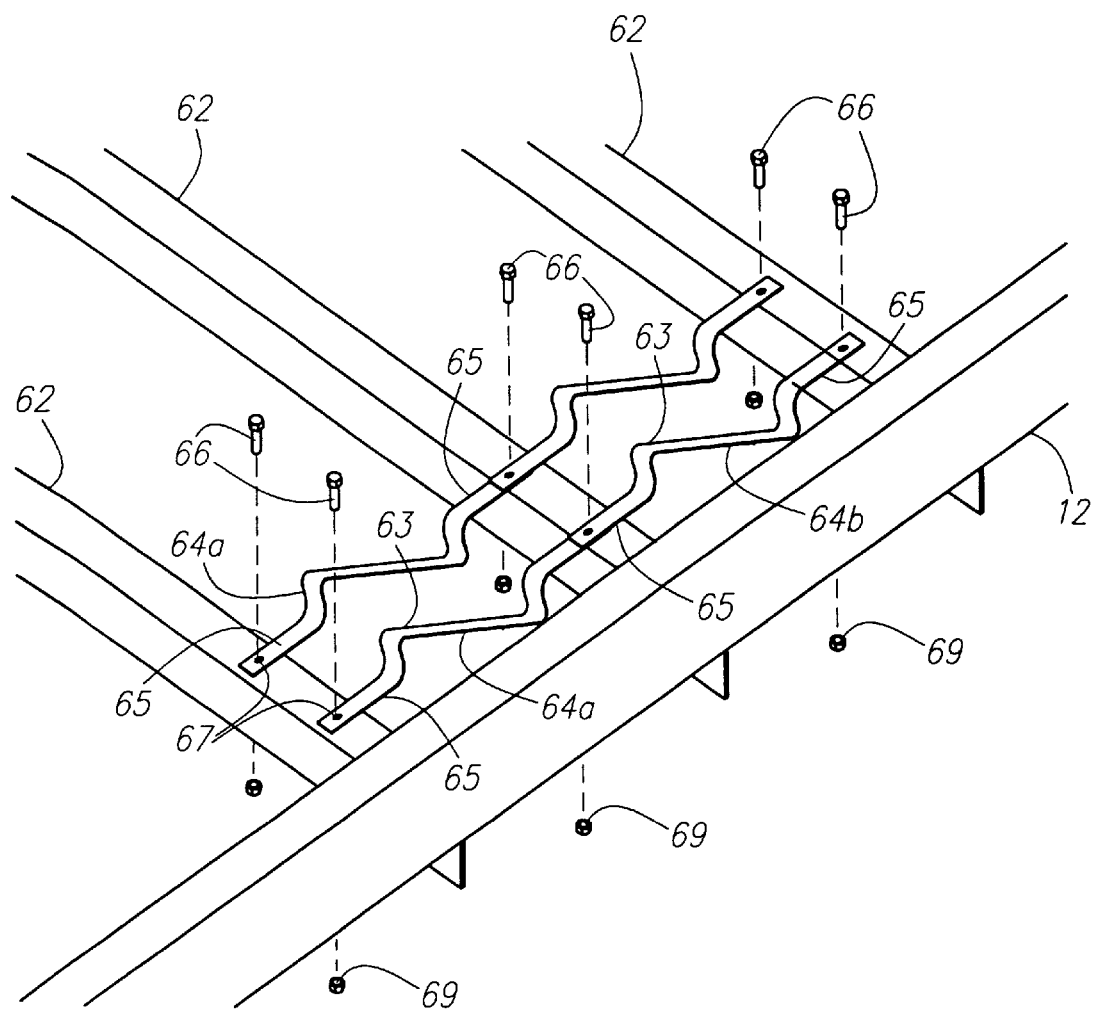
FIG. 2 is a partial perspective view of the spring latch shown in FIG. 1.

Referring to FIG. 1, the top of the cross members 62 are attached to the bottom flange 14 of the support rails 12. The cross members 62 are spaced apart such that the spring members 64 will fit between the cross members. The spring member 64 preferably consists of a pair of plates bent into approximately an N-shape with the first plate 64a attached to the front and middle cross members 62 and the second plate 64b attached to the middle and rear cross members 62, as shown in FIG. 2. The spring plates 64a and 64b are thin enough to allow for the spring plate to deflect downward, yet sufficiently thick enough so that they will return to their original shape after being deflected downward. The spring member 64, thus has two vertical projections 63, which extend above the top of the bottom flange 14 of support rails 12. The vertical projections 63 extend a sufficient height, such that the vertical projection 63 will engage with front cross member 24b of inner cart 50, as shown in FIGS. 3 and 3a.

Preferably two spaced apart spring members 64 are attached to the cross members 62 to provide additional resistive force to the carts. Each spring plate, 64a and 64b have horizontal extensions 65 on each end with holes 67 in each extension. Each cross member 62 also has holes 67 such that when the spring plates 64a and 64b of the spring member 64 are placed between the cross members 62, the holes 67 in the horizontal extensions 65 of the spring plates 64a and 64b align with the holes 67 in the cross members 62. A bolt 66 can then be placed through the hole and secured in place with a nut 69. In the middle cross member 62, the rear horizontal extension 65 of spring plate 64a and the front horizontal extension 65 of spring plate 64b overlap each other with the holes 67 in each horizontal extension 65 and the holes 67 in cross member 62 being in alignment so that bolt 66 can be inserted into the holes and secured in place by a nut 69. Preferably a nut and bolt is used to attach the spring members 64 to the cross members 62, however, any other attachment means can be used.

In a three cart arrangement, as shown in FIG. 3, with the empty carts nested, a first load-bearing pallet is placed upon the inner most cart 50 by a forklift. Then, a second load-bearing pallet is lifted by the forklift to above the level of the intermediate cart 40, such that, as the second pallet is moved into the pallet bay, it pushes against the first pallet previously loaded onto the inner most cart 50. The engagement of the first pallet by the second pallet causes the wheels 34, which are connected to the inner most cart 50 to roll rearwardly. During the time that the front wheels 34 of cart 50 are traversing the lower flanges 46 of side members 26a of cart 40 in the rearward direction, the engaged spring member 64 prevents friction between the wheels 34 and the side members 26a from causing the cart 40 to move rearwardly.

Thus when the wheels 34 of the cart 50 arrive at the rear end of side members 26a of cart 40, cart 40 has yet to appreciably move, and thereby is properly positioned to receive the second pallet. At that point, the force of the forklift, which in inserting the second pallet into the bay for placement onto cart 40, continues to push the first pallet rearwardly even after the wheels 34 hit the end of side members 26a of cart 40. This causes the first spring plate 64a to deflect downward as the cross-member 24a of cart 40 is forced against it by the forklift as shown in FIGS. 4A and 4B. As the force of the forklift continues to push the first pallet, the spring plate 64a is deflected downward such that cross member 24a is released and cart 40 is free to roll backward until it reaches the second spring plate 64b, at which point the cart 40 is again prevented from rearward movement. As the forklift continues to push the first pallet, the second spring plate 64b, will deflect downward releasing cross member 24a of cart 40. The forklift can then place the second load bearing pallet onto cart 40.

Once cart 40 is past the second spring plate 64b, the forklift can lift a third load bearing pallet to above cart 20, which has been prevented from rearward movement by the first spring plate 64a engaging with cross member 24 of cart 20. As the third pallet is lifted into position above cart 20, it pushes against the second pallet previously loaded onto cart 40, causing cart 40 to roll rearwardly. During the time the wheels 34 of cart 40 are traversing the lower flanges 46 of side member 26 in the rearward direction, the first spring plate 64a prevents friction between the wheels 34 and the side members 26 of cart 20 from causing cart 20 to move rearwardly. Thus, when the wheels 34 of cart 40 reach arrive at the end of side member 26 of cart 20, cart 20 has yet to appreciably move, and thereby is properly positioned to receive the third pallet. As the forklift continues to push against the second pallet, the first spring plate 64a again deflects downward, disengaging from cross member 24, allowing cart 20 to roll rearward until it reaches the second spring plate 64b. As the forklift continues to push the second pallet, the second spring 64b deflects downward, disengaging cross member 24 and once again allowing cart 20 to roll rearwardly.

In addition to the foregoing spring latch embodiment, there are various other mechanical equivalents that could readily be used within the scope of the invention. Such equivalents which include detent mechanisms; bump ramps; magnets; etc., hold the second cart from rolling back due to wheel friction yet release when the larger force of forklift loading is exerted.

Various numbers of the above-described latching mechanisms can be used to prevent premature rolling in push-back cart storage systems, depending on the number of carts used.

Thus, while the preferred embodiments have been shown and described, many changes and modifications may be made thereunto without the departing from the spirit and scope of the invention. The invention, therefore, should not be limited, except by the following claims, and their equivalents.

I claim:

1. A storage rack system comprising:
   a pair of spaced apart support rails;
   at least two spaced apart cross members secured to the support rails;
   a cart frame having a wheel assembly on each side supported on a lower flange of each support rail;
   at least one spring member secured to the cross members engageable with the cart frame.

2. The storage rack system of claim 1, wherein the spring member comprises at least one substantially N-shaped plate.

3. The storage rack system of claim 1, wherein two spring members are secured to the two spaced apart cross members.

4. The storage rack system of claim 3, wherein the two spring members comprise substantially N-shaped plates.

5. The storage rack system of claim 1, wherein three spaced apart cross members are secured to the support rails.

6. The storage rack system of claim 5, wherein the spring member comprises a pair of substantially N-shaped plates, placed end to end, and secured to the three spaced apart cross members.

7. The storage rack system of claim 5 wherein two spaced apart spring members are secured to the three spaced apart cross members.

8. The storage rack system of claim 7 wherein the pair of spring members each comprise a pair of substantially N-shaped plates, placed end to end, and secured to the three spaced apart cross members.

9. A push back cart storage system comprising:

a pair of spaced apart support rails;

a first cart having wheels supported on the support rails, and having opposing side members;

a second cart having front wheels supported on the side members of the first cart, and having rear wheels supported on the support rails;

at least two spaced apart cross members secured to the pair of spaced apart support rails;

at least on spring member secured to the spaced apart cross members for preventing the first cart from moving on the support rails due to rolling friction between the second cart and the first cart.

10. The storage system of claim 9, wherein the spring member comprises a substantially N-shaped plate.

11. The storage system of claim 9, wherein two spring members are secured to the spaced apart cross members.

12. The storage system of claim 9, wherein three spaced apart cross members are secured to the pair of spaced apart support rails.

13. The storage system of claim 12, wherein the spring member comprises a pair of substantially N-shaped plates placed end to end and secured to the three spaced apart cross members.

14. The storage system of claim 12, wherein two spaced apart spring members are secured to the three spaced apart cross members.

15. The storage system of claim 14, wherein the two spaced apart spring members each comprise a pair of substantially N-shaped plates placed end to end and secured to the three spaced apart cross members.

* * * * *